Jan. 31, 1933.  A. E. RAYMOND  1,895,682
TAIL WHEEL CONSTRUCTION
Filed March 21, 1932   5 Sheets-Sheet 1

INVENTOR:
Arthur E. Raymond,
BY
ATTORNEY.

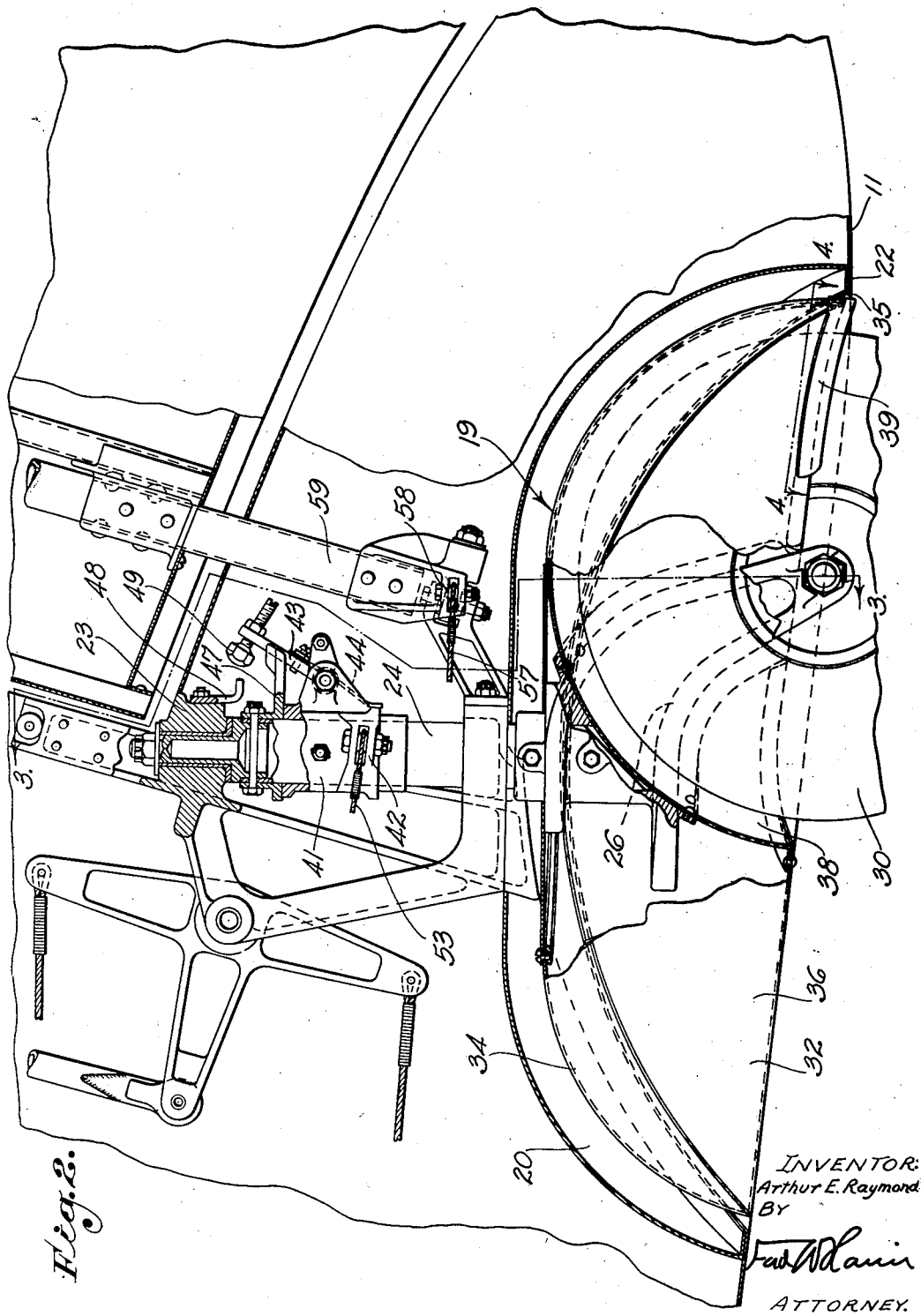

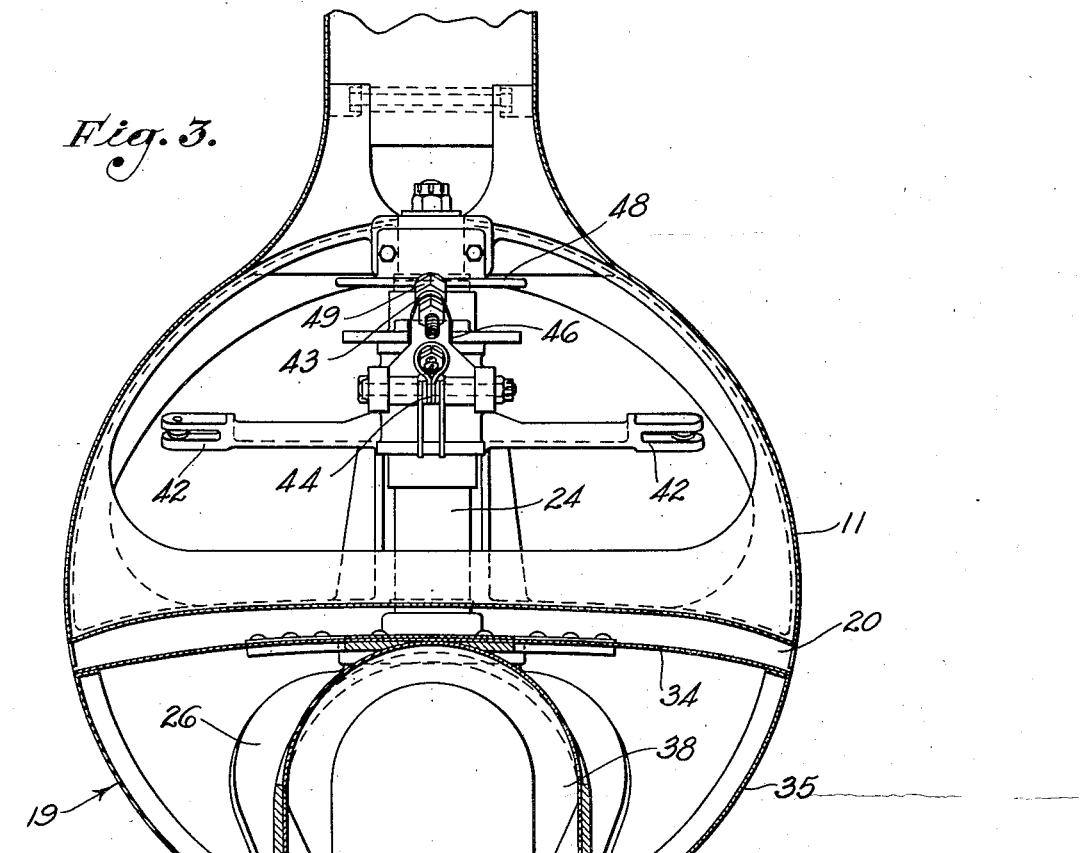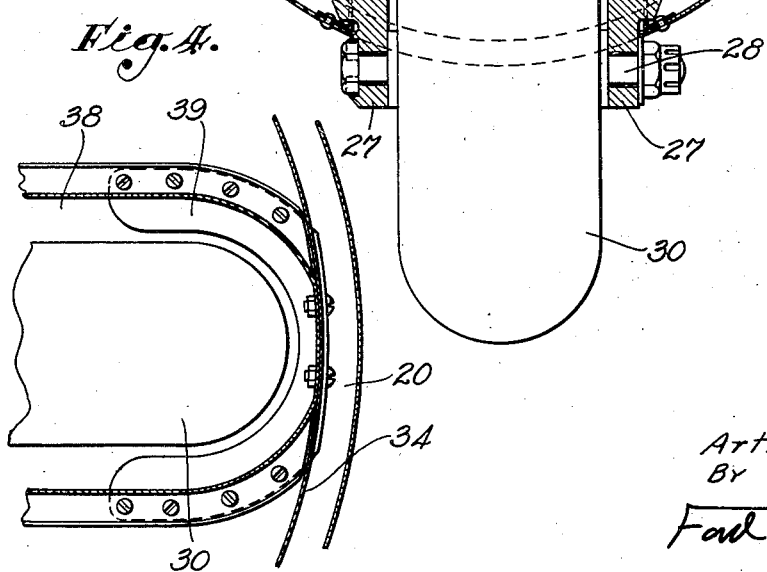

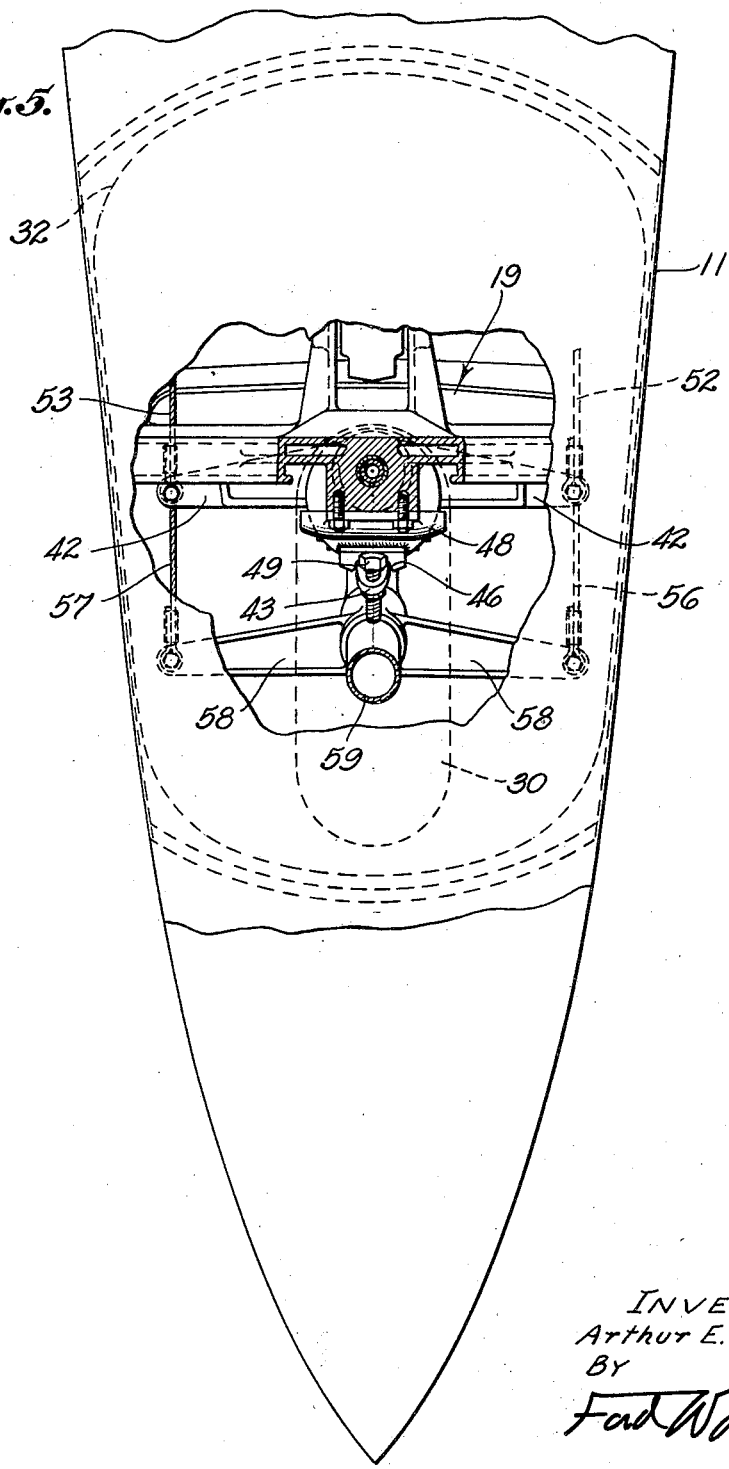

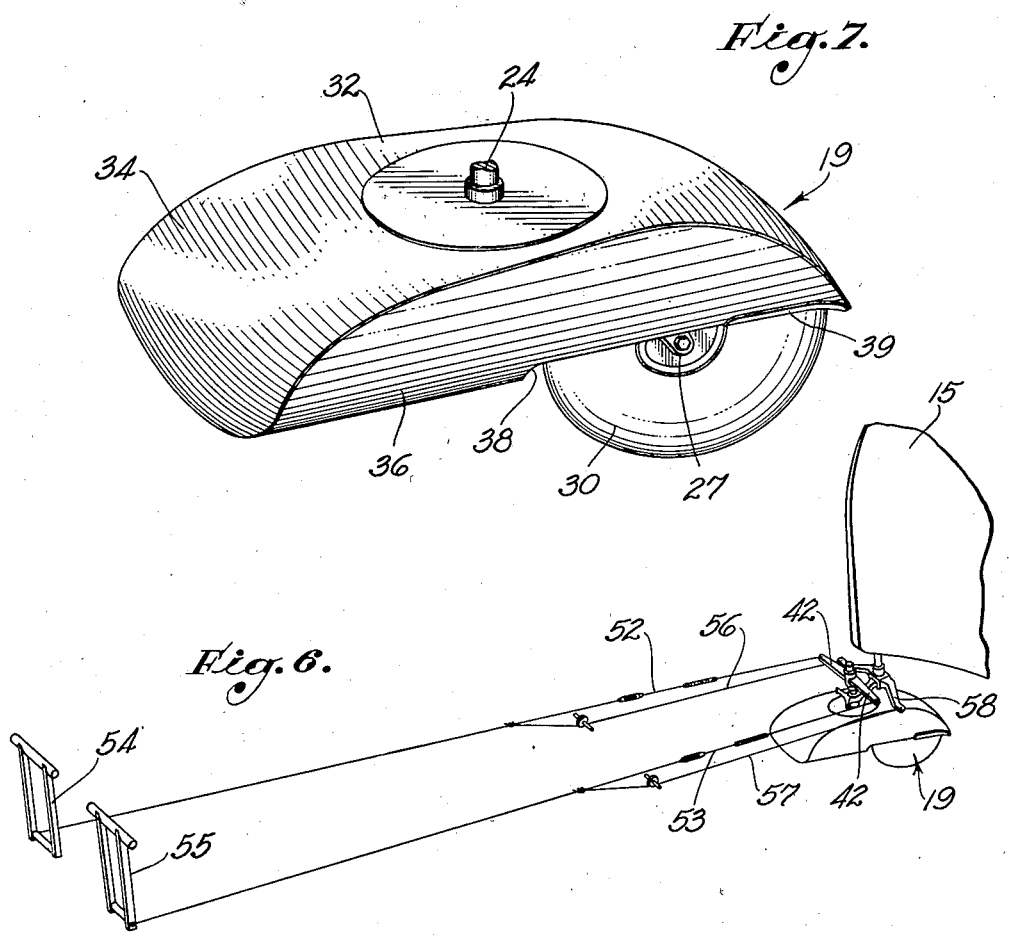

Patented Jan. 31, 1933

1,895,682

UNITED STATES PATENT OFFICE

ARTHUR E. RAYMOND, OF SANTA MONICA, CALIFORNIA, ASSIGNOR TO DOUGLAS AIRCRAFT COMPANY, INC., OF SANTA MONICA, CALIFORNIA, A CORPORATION OF DELAWARE

TAIL WHEEL CONSTRUCTION

Application filed March 21, 1932. Serial No. 600,113.

In airplane structures as much of the mechanism as possible is positioned within the fuselage and wings so that wind resistance and drag will be reduced to a minimum. There are some parts of an airplane which can not be fully enclosed by the fuselage or wings because the function which they perform requires that they be situated on the exterior. For example, the landing gears and the tail-skid or tail wheel construction must be positioned to the exterior of and below the fuselage and wings in order that they may have contact with the ground. In order to reduce drag, suitable stream-line-producing fixtures are ordinarily used.

It is an object of my invention to partly enclose a device, which must be extended at least partly on the exterior of the fuselage or wing structure, partly within the fuselage or wings so that such device may be protected or partly protected thereby. The term "device" when used without qualification is intended to mean a part of an airplane which must have at least a portion thereof on the exterior of the plane structure. The term "plane structure" when used without qualification is intended to mean fuselage, wings, or some such main structure of the airplane.

A further object of my invention is to provide an airplane having a device which is partly located within the plane structure, and which is provided with a shield having stream-line surfaces forming a part of the plane structure.

A still further object of my invention is to provide an airplane having a movable device with a shield adapted to move therewith, which shield has stream-line surfaces which form a part of the plane structure.

It is still another object of my invention to provide an airplane having a movable device which is partly within the plane structure and which has a shield which is movable with said device, the shield having stream-line surfaces forming a part of the plane structure.

It is an even further object of my invention to provide an airplane in which the plane structure is provided with a space or cavity in which the device is mounted so as to extend to the exterior of the limits of the fuselage, and in which a shield is provided for the device, which shield fills the space or cavity provided in the fuselage.

A still further object of this invention is to provide an airplane having a recess in the plane structure which has walls of cylindrical generation into which recess a non-cylindrical device is extended, and in which the device is provided with a shield which is adapted to fill the space and which has stream-line surfaces which cooperate with the stream-line of the plane structure to form a continuation thereof.

It is a still further object of my invention to provide an airplane in which a rotatable device is provided with means whereby the air velocity will return the device to normal position.

My invention in its generic form is not limited to any particular structure or device on an airplane and for that reason I do not wish to have my invention limited to any form of device which may be described as an embodiment of my invention. In the following description I will describe my invention as embodied in a tail wheel construction which is illustrative of all the objects, benefits and advantages of my invention. In describing the invention in connection with its embodiment in a tail wheel construction, it should be strictly understood that this form of my invention is described in detail only for illustrative purposes.

In connection with the specific form of my invention disclosed in the drawings to this application and in the following detailed description, it is an object of my invention to provide a tail wheel which is partly mounted in a space provided in the fuselage of the airplane. This space is of sufficient size to permit the tail wheel to move through various angular positions in order that the tail wheel may be able to perform its ordinary functions. The tail wheel construction is provided with a shield which is adapted to fill the space provided in the fuselage and which has stream-line surfaces which form a continuation of the stream-line surfaces of the fuselage.

In connection with the specific form of my invention, it is also an object thereof to provide a combination in which the tail wheel construction and the rudder are operated by a single mechanism and therefore when the rudder is moved from a normal position the tail wheel is likewise moved from normal position. My invention provides a release means whereby the tail wheel may be released from the control mechanism when the same is moved beyond a certain angular position and in which there is a shield fitting in a space of the fuselage which is engaged by the air stream for returning the tail wheel to normal position.

Other objects relating to the invention in both its generic and species form will be emphasized in the following detailed description of a single form of my invention which I believe includes all of the patentable characteristics thereof.

Referring to the drawings:

Fig. 2 is an enlarged longitudinal section taken through the tail portion of the fuselage and showing the tail wheel construction of my invention.

Fig. 3 is a section taken on the line 3—3 of Fig. 2.

Fig. 4 is a section taken on the line 4—4 of Fig. 2.

Fig. 5 is a plan view of the tail portion of the airplane which is partly sectioned to show the tail wheel construction.

Fig. 6 is a diagrammatic view showing the control mechanism which operates the rudder and the tail wheel construction.

Fig. 7 is a perspective view illustrating the exterior configuration of the tail wheel shield of the invention.

Figure 1:
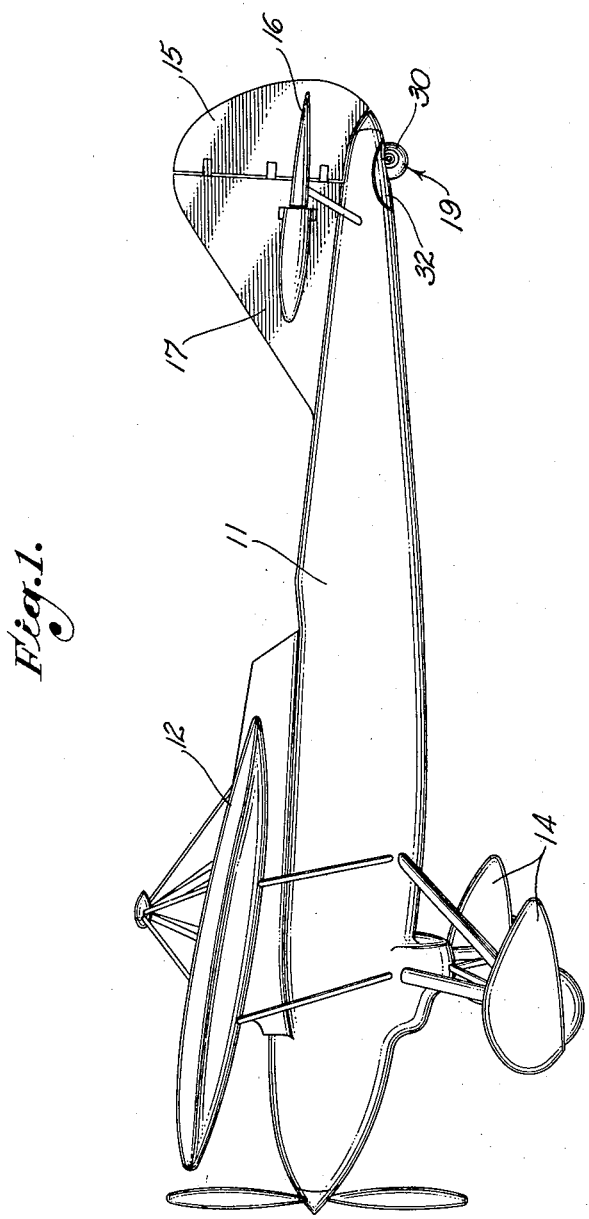
Fig. 1 is an elevational view showing an airplane which includes the present embodiment of my invention.

Referring first to Fig. 1, wherein a complete airplane is disclosed, the numeral 11 represents a fuselage which is provided with wings 12. The fuselage 11 and the wings 12 will hereafter be referred to in a broad sense as the plane structure. The term "plane structure" is used for the reason that my invention in its generic sense is adapted for use in conjunction with any of the main portions of the airplane.

The forward part of the fuselage 11 is provided with landing gears 14. The rearward or tail part of the fuselage 11 is provided with a rudder 15 and elevators 16 which are suitably supported by a structure 17. Provided in the tail portion of the fuselage 11 is a tail wheel construction 19 which embodies the features of my invention.

Having in mind the general construction of the airplane to which my invention is applied, reference will now be made to the other drawings wherein the details of construction of this embodiment of my invention are illustrated. The fuselage 11 is provided with a space or cavity 20 which is open to the bottom and side portions of the fuselage. The space is bounded by a laterally extending flange 22 which reduces clearance, as will be later explained.

Suitably secured by bracing structure 23 of the airplane is a spindle 24, the lower end of which extends into the cavity 20 and is provided with a fork 26. The fork 26 is extended downwardly so that the lower ends 27 of the arms thereof protrude slightly from the limits of the fuselage and support a shaft 28 which rotatably carries a tail wheel 30 which in its broad sense constitute a "device". The tail wheel 30, as disclosed clearly in Figs. 1, 2 and 3, projects downwardly from the fuselage, and must do so in view of the fact that when the airplane is resting on the ground or is in movement on the ground, it is in contact with the ground. It will be perceived, however, that a portion of the tail wheel and approximately one-half thereof, in the form of my invention shown, is located within the fuselage 11, being accommodated by the space or cavity 20. The tail wheel 30 is a non-cylindrical member and is mounted eccentric of the axis of the spindle 24 on which the whole structure is swingable. The space 20 which accommodates the tail wheel must be much larger than the tail wheel 30 itself, in order that there be provided sufficient clearances for this tail wheel to swing through its various angular positions.

To fill the portions of the space or cavity 20 which are not occupied at any given time by the tail wheel 30, my invention provides a structure 32 which I have denominated a "shield". The shield 32 is secured to the fork construction 26 and has an inner wall 34 which is so formed that the shield 32 may be rotated on the axis of the spindle 24 without engaging any walls of the fuselage and without increasing or decreasing the clearance space 35 formed between the shield 32 and the rim or wall 22. The shield 32 has an outer wall 36 which forms or provides a stream-line surface. This outer wall 36 is shaped and designed so that it provides a stream-line surface which forms a continuation of the fuselage 11. By an inspection of the various views of the drawings, it will be seen that the shield 32 is complementary to the fuseage and when the shield is in normal position, in which position it is shown in Figs. 2 and 3, the shield fills the space or cavity 20 and renders the fuselage of complete external continuity.

For receiving the upper part of the tail wheel 30, the shield 36 provides a semicircular recess 38 into which the upper part of the tail wheel 30 at all times projects. The cross-sectional area of the recess 38 is but slightly larger than the cross-section of the complete tail wheel in order that eddy currents and the like may be kept at a minimum. The rearward portion of the shield is provided with a mud-shoe 39 which is of semicircular contour and which extends inwardly across the mouth of the recess 38 for removing mud from the tail wheel 30 in order that such foreign matter will not accumulate in the recess 38 and possibly render the tail wheel inoperative.

Rotatably disposed on the spindle 24 above the space 20 is a sleeve 41 from which arms 42 laterally extend. The sleeve 41 carries an engager 43 which is retained in the position shown in Fig. 2 by a spring 44. When the engager is in the position shown in Fig. 2 and in Fig. 5, the engager rests in a notch 46 provided in plate or wall 47 which is secured to the spindle 24. When the parts are in the position just described, the sleeve is locked to the spindle 24 and when the sleeve is moved through the arms 42 the spindle and all of the parts secured thereto will rotate. Secured to the supporting structure above the construction just described, is a cam means 48 which is engageable by a cam engagement member 49 when the sleeve is moved through a certain angular position. When the cam means is engaged by the cam engaging member, the engager 43 is disengaged from the notch in the plate 47, with the result that the spindle 24 is disconnected from the sleeve 41 and the spindle and parts secured thereto are movable relative to the sleeve.

The arms 42 as shown in the diagrammatic view, Fig. 6, are connected to control lines 52 and 53, which are operated by foot pedals 54 and 55 located in the pilot's cockpit. The control lines 52 and 53 are associated with control lines 56 and 57, which are connected to arms 58 mounted on a vertical shaft 59, which shaft 59 is connected to and adapted to operate the rudder 15. It will therefore be seen that when the pedals 54 and 55 are operated, the tail wheel construction and also the rudder construction are operated. When the rudder 15 is moved while in flight, the tail wheel construction is likewise moved, and when this movement occurs, the tail wheel construction and the parts associated therewith move from normal position. When the parts move through the angular position in which the cam means is engaged by the cam engaging member, the spindle 24 will be disengaged from the sleeve 41, at which time the tail wheel construction and associated parts are free to return to normal position.

It is believed that the details of construction of my invention are sufficiently described in the foregoing description and that those details which have not been referred to to any great extent are clearly understandable from the drawings.

When the airplane is in flight the tail wheel construction and parts associated therewith usually occupy what I term a normal position in which the tail wheel construction is in alignment with the fuselage and in which the shield is in such a normal position that the space or cavity 20 is completely filled and the outer wall 35 thereof provides a stream-line surface which forms a continuation of and is complementary to the adjacent portions of the fuselage.

It will be seen that only a part of the tail wheel 30 extends to the exterior of the fuselage and that this part will not offer any great wind resistance or drag. I am enabled to position a portion of the tail wheel within the fuselage without creating any drag because of cavities formed therein by reason of the shield which fills the cavity or space provided in the fuselage and which provides a stream-line surface which forms a continuation of the stream-line surface of the fuselage.

If, during the flight of the airplane, the pedals 54 and 55 are operated for the purpose of swinging the rudder 15 into an angular position, the tail wheel construction and parts associated therewith are also moved into an angular position and from the position which I have identified as a normal position. In an angular position the tail wheel and the shield are moved so that they create greater wind resistances and drag and so that the shield does not form a complementary part of the cavity, nor does the outer wall 35 form a continuation of the stream-line surface of the fuselage. At such time therefore the tail wheel construction does not offer a minimum of drag, but offers the maximum drag which may be offered by the design of my invention disclosed herein. When the angular position increases to a certain extent and so that the drag might be a noticeable impairment to the flight of the plane, the tail wheel construction and parts associated therewith are automatically released by the cam engaging member 49 coming into engagement with the cam means 48. At this time the tail wheel and shield, as well as the other parts directly associated therewith, are moved by the air stream into the normal position shown in Figs. 2, 3, and 5. It will, therefore, be seen that even though it were necessary to retain the rudder in angular position, the tail wheel construction and associated parts may return to normal position and therefore offer but a minimum of drag. When the rudder is returned to normal position, the parts assume the relationship shown in Fig. 2, and the sleeve 41 is again locked to the spindle 24 by means of the engagement of the engager 43 with the plate 47. It is desirable to reestablish this relationship upon return of the rudder to normal position in order that the pilot of the plane will have control of the tail wheel construction when the plane alights.

As pointed out heretofore, the foregoing description and the drawings are illustrative of but a single form of my invention. I recognize and assert that my invention may be embodied in other constructions of the character suggested in the statement of invention of this application, and that various changes in design of the parts herein described and shown as being illustrative of the elements of my invention may be modified without departing from the spirit and scope of my invention. I do not wish to have the various elements which constitute the parts of the combination which I have produced, limited to the exact forms disclosed in the drawings or described or suggested in the specification. I intend that the claims of this application be broadly construed to cover all mechanical equivalents of the various elements which constitute the entity and all combinations of elements which utilize the principle of my invention.

I claim as my invention:

1. In an airplane, the combination of: a plane structure having a cavity formed therein; a tail wheel structure swingably supported by said plane structure and being located partly within said cavity and partly on the exterior of said plane structure; and a shield supported by said tail wheel structure and being movable therewith, said shield being positioned within said cavity to fill same.

2. In an airplane, the combination of: a plane structure having a cavity formed therein; a tail wheel structure swingably supported by said plane structure and being located partly within said cavity and partly on the exterior of said plane structure; and a shield supported by said tail wheel structure and being movable therewith, said shield being positioned within said cavity to fill same, and having a stream-line surface which constitutes a continuation of the stream-line surface of said plane structure.

3. In an airplane, the combination of: a plane structure having a cavity formed therein; a tail wheel structure swingably supported by said plane structure and being located partly within said cavity and partly on the exterior of said plane structure; and a shield supported by said tail wheel structure and being movable therewith.

4. In an airplane, the combination of: a plane structure having a cavity formed therein; a tail wheel structure swingably supported by said plane structure and having a tail wheel located partly within said cavity and partly on the exterior of said plane structure; and a shield supported by said tail wheel structure and being movable therewith, said shield being positioned within said cavity to fill same, and said shield having a recess in which the upper part of said tail wheel rests.

5. In an airplane, the combination of: a plane structure having a cavity formed therein; a tail wheel structure swingably supported by said plane structure and having a tail wheel located partly within said cavity and partly on the exterior of said plane structure; and a shield supported by said tail wheel structure and being movable therewith, said shield being positioned within said cavity to fill same and having a stream-line surface which constitutes a continuation of the stream-line surface of said plane structure, and said shield having a recess in which the upper part of said tail wheel rests.

6. In an airplane, the combination of: a plane structure, having a cavity formed therein; a tail wheel structure swingably supported by said plane structure and having a tail wheel located partly within said cavity and partly on the exterior of said plane structure; a shield supported by said tail wheel structure and being movable therewith, said shield being positioned within said cavity to fill same, and said shield having a recess in which the upper part of said tail wheel rests; and a mud-shoe secured to said shield and projected into said recess.

7. In an airplane, the combination of: a plane structure having a cavity; a movable device supported thereby partly within and without said cavity; means whereby said device may be moved; a release structure whereby said device is released from said means for moving said device; and a shield movable with said device and within said cavity for returning said device to normal position after same has been released from said means for moving said device.

8. In an airplane, the combination of: a plane structure; a device movably supported by said plane structure; means whereby said device may be moved; a release structure whereby said device is released from said means for moving said device; and a shield whereby said device is returned to normal position upon being released from said means for moving said device.

In testimony whereof, I have hereunto set my hand at Santa Monica, California, this 12th day of March, 1932.

ARTHUR E. RAYMOND.